United States Patent [19]

Tomkins

[11] Patent Number: 5,281,904
[45] Date of Patent: Jan. 25, 1994

[54] MULTI MODE CORDLESS BATTERY CHARGER

[75] Inventor: John Tomkins, Refugio, Tex.

[73] Assignee: Innova Electronics, Fountain Valley, Calif.

[21] Appl. No.: 954,166

[22] Filed: Sep. 29, 1992

[51] Int. Cl.$^5$ ............................................. H02J 7/00
[52] U.S. Cl. .......................................... 320/2; 320/21; 320/22
[58] Field of Search .................... 320/2, 21, 22, 23, 24, 320/31, 32, 39, 40, 48

[56] References Cited

U.S. PATENT DOCUMENTS

| | | | |
|---|---|---|---|
| 3,659,181 | 4/1972 | Bembenek | 320/22 |
| 3,784,892 | 1/1974 | Zelina | 320/40 |
| 3,903,429 | 9/1975 | Heffel | 320/40 X |
| 4,039,920 | 8/1977 | Popp | 320/2 |
| 4,218,644 | 8/1980 | Bourke et al. | 320/32 |
| 4,386,308 | 5/1983 | Emile, Jr. et al. | 320/22 |
| 4,670,703 | 6/1987 | Williams | 320/22 |
| 4,820,965 | 4/1989 | Siemer | 320/31 |
| 4,857,820 | 8/1989 | Tompkins et al. | 320/2 |
| 5,083,076 | 1/1992 | Scott | 320/2 |
| 5,111,127 | 6/1992 | Johnson | 320/2 |
| 5,202,617 | 4/1993 | Nor | 320/2 |

*Primary Examiner*—Kristine L. Peckman
*Attorney, Agent, or Firm*—Stetina and Brunda

[57] ABSTRACT

A self contained battery charger is disclosed for use in charging an external battery through a pair of connecting cables. The battery charger comprises an internal battery for providing a first predetermined battery voltage and a DC to DC converter, connected to the internal battery, for converting the first predetermined voltage to a low current signal. First switching circuitry is provided for communicating a low current signal to the external battery. Status monitoring circuitry is provided for monitoring voltage and/or current conditions when said low current signal is communicated to the external battery. Second switching circuitry is provided for communicating a high current signal to the external battery in response to sensed voltage and/or current conditions.

10 Claims, 1 Drawing Sheet

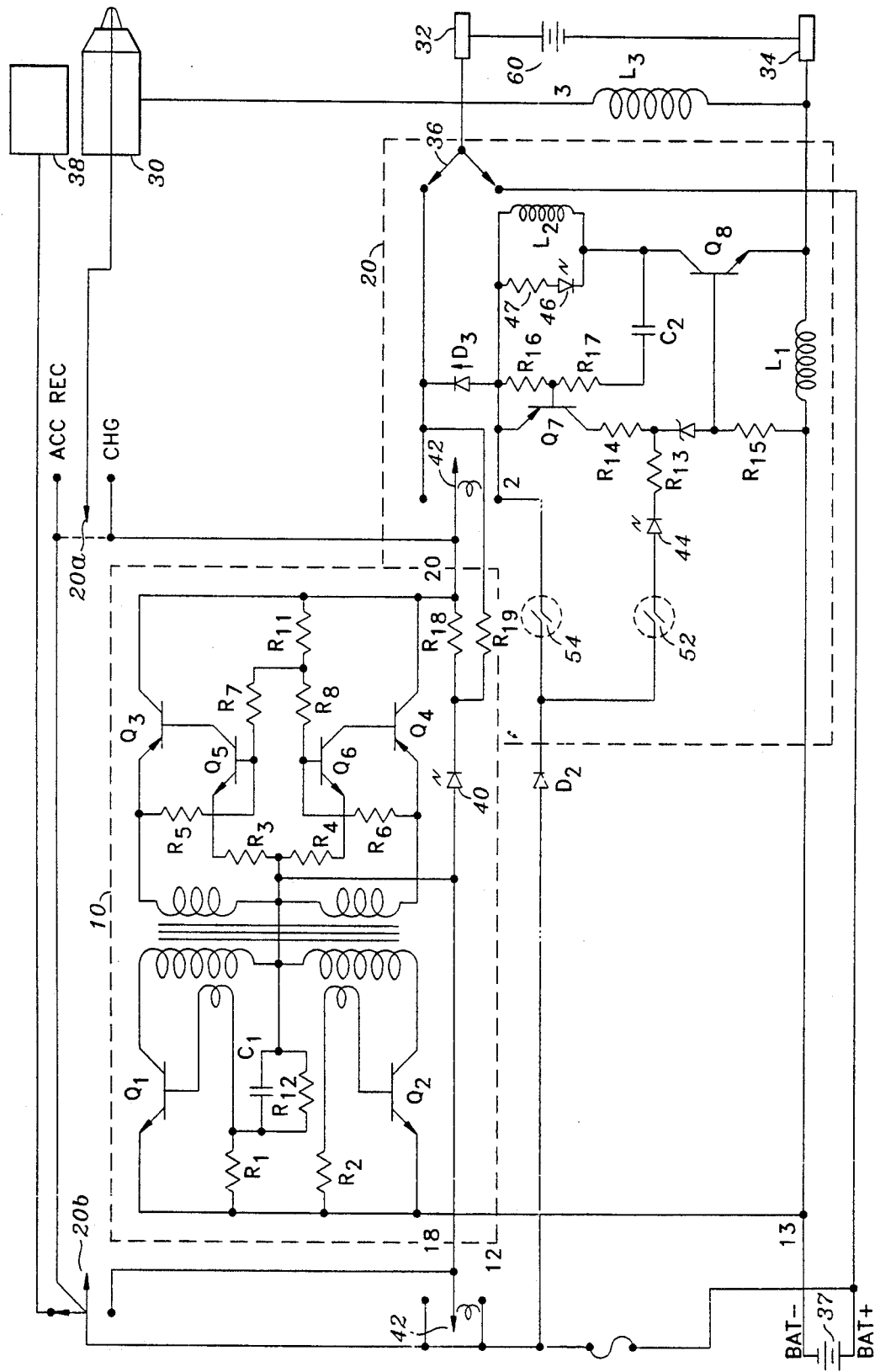

ary charger systems. The invention
MULTI MODE CORDLESS BATTERY CHARGER

FIELD OF THE INVENTION

The present invention relates to a self contained battery charger and, more particularly, to a regulated, high amperage battery charger capable of starting most vehicles very quickly after connection to the vehicle.

BACKGROUND OF THE INVENTION

Starter batteries often become sufficiently discharged so as to be unable to start a motor. This is often due to lights or other accessories being accidently left on. Also, defective vehicle charging systems can result in the same problem.

Conventional methods of starting such a disabled vehicle include push starting, using jumper cables and conventional battery chargers. Both push starting and jumper cables require the presence of another car. Furthermore, jumper cables are hazardous because, if improperly connected, they can lead to damage of the vehicles electrical system. Also an explosion of the battery gases is possible.

A disadvantage of conventional battery chargers is the need to be near a source of electrical power, such as 120 volts alternating current, to power the battery charger.

More recently, self contained battery charger systems have been proposed which incorporate an internal battery which is used to charge the vehicle battery, e.g. through a connection to the vehicle cigarette lighter socket. One such system is the JUMP START TM marketed by Innova Products of Fountain Valley, Calif. Products such as the JUMP START satisfy the requirement for a portable battery charger which does not require interconnection to an external power source. However, existing portable battery chargers are not known to have a high amperage capacity for providing an immediate jump start such as may be obtained by the use of jumper cables. This limitation of existing systems is both a function of the internal circuitry of such systems as well as inherent current limitations in the charging path typically utilized, e.g. through a cigarette lighter or some other portion of the vehicles accessory electrical system.

The present invention extends the capabilities of existing various battery charger systems. The invention disclosed herein provides a portable battery charging system which has sufficient charging capacity to start vehicles, from small cars to large recreational vehicles, within a few moments after connection. The invention further incorporates safety features to avoid potential dangers that are typically inherent in the use of conventional jumper cables.

SUMMARY OF THE INVENTION

A self contained battery charger is disclosed for use in charging an external battery through a pair of connecting cables. The battery charger comprises an internal battery for providing a first predetermined battery voltage and a DC to DC converter, connected to the internal battery, for converting the first predetermined voltage to a low current signal. First switching circuitry is provided for communicating a low current signal to the external battery. Status monitoring circuitry is provided for monitoring voltage and/or current conditions when said low current signal is communicated to the external battery. Second switching circuitry is provided for communicating a high current signal to the external battery in response to sensed voltage and/or current conditions. In the presently preferred embodiment the second switching circuitry is operative to preclude any output to the external battery when the connecting cables are disconnected from the external battery. The second switching circuitry may comprise overcurrent detection circuitry for detecting current flow from the internal battery to the external battery, the overcurrent detection circuitry being operative to preclude any output (high current or low current) to the external battery when current flow between the internal battery and the external battery exceeds a predetermined limit.

The battery charger may further include an adaptor plug connectable to the external battery through an accessory connection. Adaptor connection circuitry may be provided for disabling current flow through the connecting cables when the adaptor plug is connected to the accessory connection.

The battery charger may also include recharging circuitry for recharging the internal battery. The recharging circuitry is preferably operative to disable current flow through the connecting cables during recharging.

In another embodiment of the invention a battery charger/monitoring circuit is provided which is connectable to but does not include a charging battery. In this embodiment switching circuitry is provided which is connectable to the charging battery and operative to alternatively output either a low current signal or a high current signal to the battery being charged. Status monitoring circuitry is provided for monitoring the current and/or voltage conditions when the switching circuitry outputs a low current signal. Switch control circuitry is provided for regulating the operation of the switching circuitry to enable a high current output signal when the monitored current and/or voltage conditions are within acceptable limits. The switch control circuitry may be further operative to disable high current and/or low current outputs when the monitored voltage and/or current conditions depart from acceptable levels.

BRIEF DESCRIPTION OF THE DRAWINGS

FIG. 1 is a schematic diagram illustrating the presently preferred embodiment of the invention;

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps of constructing and operating the invention in connection with the illustrated embodiments. It is understood, however, that the same or equivalent functions and sequences may be accomplished by different embodiments that are also intended to be encompassed within the spirit and scope of the invention.

In broad terms the present invention operates to facilitate a high current flow path between a portable battery and the vehicle to be started. Various circuit elements are provided in order to facilitate safe transfer of charging current to the vehicle battery. The circuitry provides for a sequential connecting scheme whereby the high current flow path will not be enabled unless polarity conditions are correct, and sensed voltage and current conditions indicate that the vehicle battery is properly responding to an initial low current charge. If at any time the circuitry is disconnected from the battery, each safety conditions must be again confirmed prior to reestablishing the high current charging path.

The circuitry also includes means for charging the battery using a low current signal path transmitted through an accessory input in the vehicle, e.g. the vehicles cigarette lighter socket. Additionally, the circuitry provides a means for recharging the internal battery.

Referring to FIG. 1 the circuitry disclosed therein can conceptually be represented as two distinct principal portions and interconnected switching circuitry. Circuit portion 10 principally represents the low current charging circuit which is connectable to the vehicle battery 60 via male adaptor plug 30 or clamps 32, 34. In the low current only mode the output of the circuit 11 consists solely of the low current signal generated by circuit 10 communicated to the male adaptor plug 30 via switch 20a. In this mode transistor Q8 is maintained in an off condition, keeping solenoid switch 36 in the upper or normally closed position and precluding the high current flow path from the battery 37.

The circuit 10 also functions during an initial period when the circuit 11 is connected to the vehicle battery 60 via clamps 32 and 34. In this low current/high current mode the circuit 10 is placed in communication with the vehicle battery 60 via a path through switch 42, diode D3 and solenoid switch 36. Once the low current signal from circuit 10 is communicated to the vehicle battery the control circuitry 20 operates to sense current and voltage conditions indicating that the vehicle battery is accepting the low current charge. The circuitry 20 then operates to activate solenoid switch 36, enabling the high current path from the battery 37 to the vehicle battery 60.

In the event the sensed voltage or current conditions vary, the control circuitry 20 operates to return solenoid switch 36 to its original position, disabling the high current path. Thus, the circuitry operates to selectively and safely enable a signal path predicated upon sensed conditions thereby insuring safe operation of the battery charger.

Referring to FIG. 1 the circuitry 10 comprises a low current circuit similar to that disclosed in U.S. Pat. No. 4,857,820 "Cordless Battery Charger" by John C. Tomkins and Charles C. Cook. As in the patented circuit the circuit 10 operates to generate a charging current that may be communicated to the vehicle storage battery to charge a vehicle storage battery through a connector through male adaptor plug 30, insertable into a vehicle cigarette lighter socket. The low current charging circuit is enabled by switch 20a which alternatively connects adaptor plug 30 to either circuit 10 or to a circuit for recharging the battery 37. Switch 20b also operates to selectively enable a recharging circuit via connector 38.

When the circuit 11 is connected to the vehicle via clamps 32 and 34 an output of low current circuit 10 is utilized during an initial portion of the normal operational sequence. That sequence proceeds as follows. With the switch 42 in the off (middle) position connector clamps 32 and 34 are connected to the vehicle battery. No current will then flow from the circuit 11 to the vehicle battery 60. However, red LED 40 will illuminate if the connectors 32, 34 are connected to the wrong polarity terminals of the vehicle battery. Such reverse polarity conditions will preclude current flow between the circuit 11 and the vehicle battery regardless of the position of switch 42.

In order to initiate current flow to the vehicle battery the switch 42 is moved to the momentary (lower) position. This enables circuits 10 and 20. Enablement of low current circuit 10 initiates a low current flow from circuit 10 to clamp 32 via switch 42, diode D3 and solenoid switch 36. In normal conditions the current flow to the vehicle battery 60 has the effect of increasing the voltage at the battery 60. Current flow from circuit 10 also results in current through the return line through coil L1 to the internal battery. Current flow through coil L1, closes the reed switch 52. This causes transistor Q8 to be turned on and yellow LED 44 to illuminate. This indicates that the low current circuit 10 is charging the vehicle battery.

Activation of transistor Q8 also results in current flow through coil L2 which activates solenoid switch 36 (moves contact to lower position) and closes reed switch 54. The reed switch 54 is closed due to its close proximity to the magnetic field generated by the current flowing through the coil L2 of the solenoid 36. Activation of solenoid switch 36 connects the battery 37 directly to the vehicle battery 60, and disables the output signal from low current circuit 10. The closing of reed switch 54 enables a current flow path to coil L2 even when switch 42 is moved from the momentary position. Activation of transistor Q8 will also cause green LED 46 to illuminate, indicating that the high current charging path has been enabled. Resistor 47 limits the current through green LED 46.

Once the solenoid 36 is enabled switch 42 may be released from the momentary (lower) position and returned to the middle position. Capacitor C2 in circuit 20 operates to maintain current flow through coil L2 during the swing time from the momentary (lower) position to the middle position. The movement of switch 42 back to the middle position then removes the power from circuit 20 and thereby continually enables a high current charging path from the battery 36 to the vehicle battery 60.

Circuit 20 operates to disable the high current signal path upon the occurrence of various events indicating unsafe conditions are present. For example, circuit 20 disables the high current signal path when clamps 32 or 34 are disconnected, or in the event sensed voltage or current conditions deviate from established parameters, e.g. voltage level remains between 9-15 and current level is approximately ¼ amp minimum. Where clamps 32 or 34 are disconnected current flow through coil L1 terminates. The termination of current flow through coil L1 causes reed switch 52 to open, thus disabling control circuitry 20 and deactivating solenoid switch 36 turning transistor Q8 off, (moving to the upper position). The termination of current flow through L2 also causes reed switch 54 to open. Additionally, if the voltage drop across coil L1 deviates from established norms the potential across the base to emitter potential of transistor Q8 will cause transistor Q8 to turn off, again deactivating solenoid switch 36 thereby disabling the control circuit 20.

The circuit 20 therefore operates to sense both current and voltage conditions at the vehicle battery 60, and to disengage the circuit 11 from battery 60 when such conditions deviate from predetermined levels. Moreover, the manner in which such conditions are monitored is not dependant upon the operation or voltage level of the vehicle battery 60. Rather, circuit 20 is powered and functions independent of conditions of vehicle battery 60.

As indicated above the circuit 11 also operates to charge the vehicle battery via male adaptor plug 30. In this low current only mode the low current output signal from circuit 10 is communicated to the male adaptor plug via switch 20a. Coil L3 operates to close reed switch 52 when current is passing through it. Any value of minimal current can be selected to generate a sufficient magnetic field to close reed switch 52. In this application the value selected in about ¼ amp. Closing the reed switch 52 along with some added circuitry allows the yellow led to illuminate and still maintain the solenoid 26 disabled.

In the recharge mode the battery 37 may be recharged from either connector 38 or male plug adaptor 30, through switch 20a or 20b. During recharging switch 42 is in the off (middle) position, disabling circuits 10 and 20.

As will be recognized by those of ordinary skill in the art portions of circuit 11 may have application independent of the entire circuit 11. For example, circuit 20 may be independently attached to or incorporated within a vehicle battery. In such an environment the circuit 20 provides valuable safety functions of regulating charging conditions to the vehicle battery 60. In such an embodiment the circuit 10 may be substantially replaced by a current limiting resistor which limits the current flow to the vehicle battery during the initial low current sequence wherein the status of the vehicle battery tested. Once that status monitoring is complete the circuit 20 operates as described above, to enable a high current path to the vehicle battery 60. Thus, in this embodiment, as in the above described embodiment, switch 42 receives and communicates a low current signal to the vehicle battery 60. Upon confirmation of current and voltage conditions in the charging path the circuit 20 enables a high current signal path through solenoid switch 36. In such an alternate embodiment circuit 10 may be replaced by current limiting resistor limiting the current flow from the battery 37 to the switch 42.

The above description in conjunction with the appended is illustrations therefore intended to described and illustrate other embodiments and modifications being also within the scope of the appended claims.

What is claimed is:

1. A self contained battery charger for use in charging an external battery through a pair of connecting cables, said battery charger comprising:
   an internal battery for providing a first predetermined battery voltage;
   a DC to DC converter connected to the internal battery for converting said first predetermined voltage to a low current signal;
   first switching circuitry for communicating said low current signal to the external battery through said terminals;
   status monitoring circuitry for monitoring voltage and current conditions at the external battery;
   second switching circuitry for communicating a high current signal to the external battery, in response to said status monitoring circuitry.

2. The self contained battery charger as recited in claim 1 wherein said first switching circuitry comprises a manually operated switch.

3. The self contained battery charger as recited in claim 1 wherein said second switching circuitry is operative to preclude any output to the external battery when the connecting cables are disconnected from the external battery.

4. The self contained battery charger as recited in claim 1 wherein said second switching circuitry comprises overcurrent detection circuitry for detecting current flow from the internal battery to the external battery, said overcurrent detection circuitry being operative to preclude any output to the external battery when current flow between the internal battery and the external battery exceeds a predetermined limit.

5. The self contained battery charger as recited in claim 1 further comprising: p1 an adaptor plug in electrical communication with said DC to DC converter and the external battery through an accessory connection for charging the external battery; and
   adaptor connection circuitry for disabling current flow through the connecting cables when said adaptor plug is connected to the accessory connection.

6. The self contained battery charger as recited in claim 1 further comprising recharging circuitry for recharging the internal battery, said recharging circuitry further being operative to disable current flow through connecting cables during recharging.

7. A battery charger/monitoring circuit for enabling current flow between a charging battery and a battery to be charged, the circuit comprising:
   a switching circuitry connectable to the charging battery said switching circuitry being operative to alternately output to the battery to be charged one of a low current signal and a high current signal;
   status monitoring circuitry for monitoring current and voltage conditions when the switching circuitry is outputting said high current signal in response to said monitored current and voltage conditions.

8. The circuit as recited in claim 7 wherein said switching circuitry is operative to enable a high current output from said switching circuitry only when said monitored voltage and current conditions are within predetermined limits.

9. The circuit as recited in claim 7 wherein said switch control circuitry is further operative to disable any output from the switching circuitry when said monitored voltage and current conditions depart from predetermined values.

10. The circuit as recited in claim 10 wherein said switching circuitry comprises a momentary switch operative to enable a low current path when depressed in a momentary position.

* * * * *